United States Patent [19]

Kitamura et al.

[11] Patent Number: 4,883,717

[45] Date of Patent: Nov. 28, 1989

[54] VIBRATION-DAMPING MATERIAL

[75] Inventors: Shuji Kitamura, Nagaokakyo; Takuzo Okumura, Tokyo; Yoshio Tadokoro; Hiroo Toya, both of Ibaraki; Yoshiaki Togawa, Kyoto; Toshitsugu Kikuchi, Ibaraki; Tadayuki Ohmae, Chiba; Mitsuyuki Okada, Ichihara; Minoru Nishihara, Kyoto; Toshiaki Shiota, Takatsuki; Hiroyuki Nagai, Nishinomiya, all of Japan

[73] Assignees: Sumitomo Chemical Company, Limited; Sumitomo Metal Industries, Ltd., both of Osaka, Japan

[21] Appl. No.: 133,238

[22] Filed: Dec. 14, 1987

Related U.S. Application Data

[63] Continuation of Ser. No. 784,031, Oct. 4, 1985, abandoned.

[30] Foreign Application Priority Data

Oct. 11, 1984 [JP] Japan .................................. 59-213787
Oct. 11, 1984 [JP] Japan .................................. 59-213788
Oct. 13, 1984 [JP] Japan .................................. 59-215007

[51] Int. Cl.$^4$ ..................... G10K 11/16; B60R 13/08; B32B 15/08; F16F 1/36
[52] U.S. Cl. ..................... 428/458; 428/460; 428/462
[58] Field of Search ..................... 428/457–463

[56] References Cited

U.S. PATENT DOCUMENTS

T934,013   5/1975  Heffelfinger ..................... 428/458
4,059,715 11/1977  Pletcher .
4,071,048  1/1978  Watase ..................... 428/458 X
4,143,790  3/1979  Ueno et al. ..................... 428/458 X
4,664,983  5/1987  Nakamura et al. ..................... 428/458

FOREIGN PATENT DOCUMENTS 0078174   5/1983  European Pat. Off. .
0100147   2/1984  European Pat. Off. .
0115103   8/1984  European Pat. Off. .
0138557   4/1985  European Pat. Off. .
35662     6/1970  Japan .
35663     7/1970  Japan .
35664     8/1970  Japan .
17064     3/1971  Japan .
35072     5/1972  Japan .
143880    9/1975  Japan .
106190   12/1976  Japan .
9794      2/1978  Japan .
3028      2/1979  Japan .
80454     4/1984  Japan .
1535198  12/1978  United Kingdom .

Primary Examiner—Nancy Swisher
Attorney, Agent, or Firm—Stevens, Davis, Miller & Mosher

[57] ABSTRACT

A vibration-damping material consisting of two metal plates and a vibration-damping layer of thermoplastic resin interposed between the two metal plates, in which said thermoplastic resin has a percentage of wlongation at 20° C. of 30% or more, preferably 50% or more, a peak temperature of dissipation factor (tan δ) in the range of −50° C. to 130° C., and a bonding strength toward the metal plates of 3 kg/cm or more as determined by 180°-peeling test at 20° C.

36 Claims, 4 Drawing Sheets

VIBRATION-DAMPING MATERIAL

This application is a CONTINUATION of application Ser. No. 784,031, filed Oct. 4, 1985 now abandoned.

BACKGROUND OF THE INVENTION

1. Field of the Invention

This invention relates to a vibration-damping material consisting of two metal plates and a vibration-damping layer of thermoplastic resins interposed between them. More particularly, it relates to a vibration-damping material with extremely high vibration-damping ability and excellent workability in deep drawing, bending, etc.

2. Description of the Prior Art

In recent years, the influence of noise caused by transportation means such as automobiles and railway cars or of noises and vibrations generated at factories and construction sites upon residents in the neighborhoods is becoming more and more serious incurring a big social problem.

As one means for solving the problem, research and development on vibration-absorbing materials having a vibration-absorbing ability by themselves have been made and, as a result, vibration-damping materials having a high vibration-absorbing ability and suitable for various application purposes are already in use as structural members of vehicles, vessels, industrial machines, iron bridges and the like.

As to the noise from automobiles, much noise is generated from parts around the engine, particularly from an oil pan, and its reduction has been strongly required.

As such vibration-damping materials, there have hitherto been known metal/resin/metal multilayer structures using, for their middle layer, a composition such as vinyl acetate-ethyl acrylate copolymer (Japanese patent publication No. 35662/1970), a copolymer obtained by grafting a vinyl acetate-ethylene copolymer with a mixture of styrene and acrylonitrile (Japanese patent publication No. 17064/1971) and a resin composition comprising mainly polyolefin type resin modified with carboxylic acids [Japanese patent application Kokai (laid-open) No. 80454/1984]; or materials composed of a bitumen and a filler such as calcium carbonate.

However, though these vibration-damping materials each show a vibration-absorbing ability in a particular temperature region they have drawbacks in vibration-damping property in that they do not show a sufficiently high vibration-damping ability in temperature regions necessary for various practical applications or they show such high vibration-damping ability only in a narrow temperature region. Moreover, such multi-layer structures have various drawbacks including poor deep drawing or bending characteristic in mechanical pressing (due to insufficient bonding with metal plates, small modulus of elasticity of middle layer composition, etc.), and poor heat resistance. Thus, they are insufficient in secondary workability as vibration-damping metal plates.

The conventional vibration-damping metal plates have various drawbacks in workability in mechanical pressing, etc. In deep drawing, for example, metal plates cause slippage at the ends and, in an extreme case, the two, upper and lower layer, metal plates come off the middle layer vibration-damping resin and cause separation. Further, the low modulus of elasticity in shear of the resin layer causes problems such as surface waviness of shaped articles and wrinkle formation at curved corner surfaces. In severe 180° bending (so-called hemming) which is applied to the ends of vibration-damping metal plates, waviness and wrinkles appearing on the surface of metal plates become more serious making these metal plates unusable in practical applications.

SUMMARY OF THE INVENTION

In view of the above drawbacks of conventional vibration-damping materials, the present invention is intended to provide a high performance vibration-damping material excellent in workability in deep drawing, bending, etc. and showing an excellent vibration-damping characteristic over a wide range of temperatures.

Thus, the present inventors have found that a vibration-damping material consisting of two metal plates and a vibration damping layer of thermoplastic resin defined below interposed between the metal plates has an excellent workability in deep drawing and bending as well as a high heat resistance and a high vibration-absorbing ability. Said vibration-damping layer of thermoplastic resin is composed of a single layer or multi-layer each formed of at least one specified resin having a percentage of elongation at 20° C. of 30% or more, preferably 50% or more, and a temperature at which dissipation factor (tan $\delta$) shows a peak value in the range of $-50°$ C. to 130° C., and, when it has a multi-layer structure it is composed by laminating two or more vibration-damping layers having different vibration-damping characteristics, and the bonding strength between the metal plates and the layers of the thermoplastic resin adjoining the metal plates is 3 kg/cm or more as determined by 180°-peeling test at 20° C. The present invention has been attained based on this finding.

DETAILED DESCRIPTION OF THE INVENTION

Suitable resin usable in this invention having a percentage of elongation at 20° C. of 30% or more, a peak temperature of dissipation factor (tan $\delta$) in the range of $-50°$ C. to 130° C., and a bonding strength toward the metal plates of 3 kg/cm or more as determined by 180°-peeling test at 20° C. in polyester type resins.

The polyester type resin referred to herein is a polymer formed of a dicarboxylic acid component comprising at least 40% by mole of terephthalic acid and a diol component. Examples of the dicarboxylic acid component other than above-mentioned terephthalic acid are aliphatic dicarboxylic acids having 2 to 20 carbon atoms such as azelaic acid, sebacic acid, adipic acid, and dodecanedicarboxylic acid; aromatic dicarboxylic acids such as isophthalic acid and naphthalenedicarboxylic acid; and alicyclic dicarboxylic acid such as cyclohexanedicarboxylic acid, used alone or as a mixture thereof. Examples of the diol component include aliphatic or alicyclic glycols such as ethylene glycol, 1,3-propanediol, 1,4-butanediol, 1,6-hexanediol, 1,10-decanediol, neopentyl glycol, 1,4-cyclohexanediol, and 2-ethyl-2-butyl-1,3-propanediol, used alone or as a mixture thereof.

Preferable among these polymers is a polyester type copolymer comprising terephthalic acid residues, ethylene glycol residues and 1,4-cyclohexanediol residues. Particularly preferable example is an amorphous polyester copolymer resin containing 1,4-cyclohexanedimethanol residues in a larger proportion than that of ethylene glycol residues (for example, Kodar ® PETG 6763, mfd. by Eastman Kodak Co.). Another particularly preferable example is a polyester resin synthesized from terephthalic acid, isophthalic acid, and 1,4-cyclohexanedimethanol (for example, Kodar ® PCTA resin A-150, mfd. by Eastman Kodak Co.).

Further, among thermoplastic high molecular weight polyester resins, amorphous polyester resins [for example, Vylon ® (mfd. by Toyobo Co., Ltd.) #200 (Tg: 67° C.), #103 (Tg: 47° C.), #290 (Tg: 87° C.), #300 (Tg: 7° C.), #500 (Tg: 4° C.), #600 (Tg: 47° C.), and #GK130 (Tg: 10° C.)] have an extremely high dissipation factor (tan $\delta$) attributable to a glass transition temperature (Tg) and a high loss factor ($\eta$) accompanying it, and thus are also particularly preferable.

Also, crystalline polyester resins [for example, Vylon ® (mfd. by Toyobo Co., Ltd.) #30P (Tg: −28° C.), #GM900 (Tg: −20° C.), #GM400 (Tg: 19° C.), #GM990 (Tg: −20° C.), #GV100 (Tg: 52° C.) and #GV700 (Tg: 54° C.)] give a high loss factor ($\eta$) over a wide temperature range when made into a metal/resin/metal laminate and thus are preferable resins.

Mixtures of the above-mentioned thermoplastic high molecular weight polyester resins have also preferable properties.

In the case of above-mentioned mixtures, a certain combination of an amorphous resin and a crystalline resin exists which can give a high vibration-damping ability unobtainable by the use of each of the resin alone.

Though the polyester type resin alone can also give a material having an excellent bonding strength toward metal plates and excellent workability and vibration-damping property, it is preferably mixed with polyolefin type resin having an excellent bonding strength toward metal plates in order to further enhance the bonding strength toward metal plates and to improve the workability in pressing as a metal/resin/metal laminate.

The polyolefin type resin used in this invention is a copolymer of ethylene and/or an $\alpha$-olefin with a monomer having an adhesive functional group. Examples of such copolymers include ethylene-glycidyl methacrylate copolymer, ethylene-glycidyl methacrylate-vinyl acetate terpolymer, ethylene-acrylic acid copolymer, ethylene-maleic anhydride copolymer, and ethylene-maleic anhydride-acrylic ester terpolymer. Particularly, ethylene-glycidyl methacrylate copolymer or ethylene-glycidyl methacrylate-vinyl acetate terpolymer is preferably used. In the above-mentioned copolymers, the content of glycidyl methacrylate is 0.5 to 20% by weight, preferably 1 to 15% by weight and that of vinyl acetate is 0 to 20% by weight, preferably 1 to 10% by weight. The ethylene-glycidyl methacrylate copolymer or the ethylene-glycidyl methacrylate-vinyl acetate terpolymer mentioned above can be mixed with the polyester type resin in a proportion of 1 to 900 parts by weight, preferably 20 to 150 parts by weight, relative to 100 parts by weight of the polyester type resin.

Further, it has been found that an epoxy resin (a chain-like condensation product having at least two epoxy groups in the molecule obtainable by the reaction of epichlorohydrin with a bisphenol or a polyhydric alcohol) can be mixed with the polyester type resin to improve the bonding strength toward metal plates and thus provide a preferable material to be used in this invention.

The mixture of the polyester type resin and the polyolefin type resin mentioned above was formed into a film, interposed between steel plates to form a plate of a sandwich structure, and the loss factor ($\eta$), namely a vibration-damping property, was determined. The results of the determination have revealed that, although a resin mixture has usually a defect of low peak height of loss factor as compared with each of the component resins used alone, the mixture of the polyester type resin and the polyolefin type resin according to this invention shows no change in the peak height, keeping a high vibration-damping ability.

Further, it has been found that when a resin composition in which the peak temperature of dissipation factor (tan $\delta$) attributable to the glass transition temperature (Tg) lies within the "application temperature region" is used as the vibration-damping layer of this invention, from the viewpoint of workability in the ordinary temperature region and high vibration-damping ability in the application temperature region, an extremely excellent vibration-damping property can be obtained.

The application temperature region referred to herein is the temperature range in which a vibration-damping ability is required. In the case of automobile engine parts, for example, a high vibration-damping ability should be maintained within the temperature range of 50° to 130° C., with 80° to 90° C. as the center.

Further, it has been revealed that in order to obtain a high vibration-damping ability the resin used for the vibration-damping layer must have a peak value of dissipation factor (tan $\delta$) of at least 0.8, which results in a vibration-damping material having a particularly preferable property with a loss factor ($\eta$) of at least 0.5.

The resin composition having good physical properties as mentioned above is the resin composition (C) referred to in this invention.

Among the resin compositions (C) comprising polyester type resin or a mixture of polyester type resin and polyolefin type resin, those having a peak temperature of dissipation factor (tan $\delta$) in the range of 25° to 115° C. and a peak value of tan $\delta$ of at least 0.8 can be particularly preferably used.

According to this invention, the vibration-damping property can be further enhanced by laminating two or more resin layers having different vibration-damping properties to form a vibration-damping layer.

An example of such laminated layer is a vibration-damping layer comprising a combination of layers each formed of resin having a peak value of dissipation factor (tan $\delta$) of at least 0.5 and a peak temperature of said factor differing by 5° to 20° C. from each other. This combination gives a high vibration-damping ability over a wide temperature range and also an excellent workability in the ordinary temperature region.

Another example is a vibration-damping layer comprising a combination of layers of resins having glass transition temperatures (Tg) differing by 5 to 15° C. from each other. More specifically, a vibration-damping layer of three layer structure is more preferable which consists of a resin layer having a glass transition temperature (Tg) of 45° C. to 60° C., one having that of 60° C. to 75° C., and one having that of 75° C. to 90° C..

It has been revealed that in combining resin layers having different glass transition temperatures (Tg), the use of polyester type resin or a mixture of polyester type resin and polyolefin type resin or a mixture of polyester type resin and epoxy resin gives a metal/resin/metal laminate having particularly preferable property with a loss factor ($\eta$) of at least 0.5, which can be suitably used for automobile engine parts.

Examples of resins usable in the vibration-damping layer having a multilayer structure according to this invention include, besides those mentioned above, vinyl resins, typified by polyvinyl chloride resin, polyvinyl acetate resins or vinyl chloride-ethylene-vinyl acetate terpolymer resin, used alone, or a resin mixture of vinyl resin with above mentioned various kinds of polyolefin type resin and polyester type resin. Further, the above-mentioned various kinds of polyolefin type resins can be used each alone or as a mixture thereof as one or two layers of the multilayer structure.

Then, another vibration-damping material having a vibration-damping layer of multilayer structure constituting this invention will be described in detail.

Thus, said vibration-damping layer consists of film or sheet formed of a resin composition (D) as the middle layer and resin layers formed of a resin composition (C) provided on both sides of said film or sheet as an upper and an lower layer, said resin composition (D) being composed of (1) at least one resin selected from the group consisting of polyolefin type resins and ionomer resins each having a percentage of elongation at 20° C. of 50% or more and a temperature at which the dissipation factor (tan $\delta$) shows a peak value in the range of $-50°$ C. to 130° C. or (2) a resin mixture of said at least one resin with a synthetic rubber having a percentage of elongation at 20° C. of 100% or more and a temperature at which the dissipation factor (tan $\delta$) shows a peak value in the range of $-100°$ C. to 130° C., and said resin composition (C) being composed of polyester type resin or a mixture of polyester type resin and polyolefin type resin having a modulus of elasticity in shear at 20° C. higher than that of the resin composition (D), a percentage of elongation at 20° C. of 30% or more, a temperature at which the dissipation factor (tan $\delta$) shows a peak value in the range of $-40°$ C. to 180° C., and a bonding strength toward metal plates of 3 kg/cm or more as determined by 180°-peeling test at 20° C.

Examples of the polyolefin type resin or the ionomer resin constituting the resin composition (D) and having a percentage of elongation at 20° C. of 50% or more and a peak temperature of dissipation factor (tan $\delta$) in the range of $-50°$ C. to 130° C. are homopolymers of ethylene or $\alpha$-olefin and copolymers of ethylene or an $\alpha$-olefin (main component) with a different monomer. Specific examples thereof include low density polyethylenes (LDPE), ethylene-propylene copolymer, ethylene-butene copolymers, ethylene-vinyl acetate copolymers, ethylene-acrylic acid copolymers, and ethylene-methacrylate copolymers.

Ionomer resins are resins obtained by copolymerizing an $\alpha$-olefin with an $\alpha,\beta$-unsaturated carboxylic acid and crosslinking the resulting copolymer with a metal ion. Ordinarily, ethylene is used for the $\alpha$-olefin and methacrylic acid for the $\alpha,\beta$-unsaturated carboxylic acid, and the proportion of methacrylic acid in the copolymer is 1 to 5% by mole. Ionomer resins using $Na^+$ or $Zn^{++}$ as the metal ion are commercially available, for example, from DuPont Co. with a trade name of Surlyn.

Of these resins, ethylene-vinyl acetate copolymers and ethylene-acrylic acid copolymers are preferred from the viewpoint of workability.

As the synthetic rubber having a percentage of elongation at 20° C. of 100% or more and a peak temperature of dissipation factor (tan $\delta$) in the range of $-100°$ C. to 130° C., there can be used vulcanized rubbers such as nitrile rubber (NBR), styrene-butadiene rubber (SBR), acrylic rubber (AR), fluorine rubber (FR), butyl rubber (IIR), natural rubber (NR), synthetic isoprene rubber (IR), butadiene rubber (BR), chloroprene rubber (CR), ethylene propylene rubber (EPR) and chlorinated butyl rubber (CIR); and elastomers such as 1,2-polybutadiene and thermoplastic urethane polyester elastomer.

Of these, butyl rubber, namely a isobutylene-isoprene copolymer, is preferred in view of workability and vibration-damping ability.

The various types of resin compositions used in this invention can be incorporated with 20% by weight or less of a filler including inorganic substances such as carbon black, calcium carbonate, talc and mica; and metals.

It has been revealed that when the vibration-damping layer of this invention is of multilayer structure, an extremely excellent vibration-damping property can be obtained by using as an upper and a lower layer film a resin having a peak temperature of dissipation factor (tan $\delta$), attributable to the glass transition temperature (Tg), in the application temperature region from the viewpoint of workability and high vibration-damping ability and using as a middle layer film a resin having a peak temperature of dissipation factor (tan $\delta$), attributable to melting, in the application temperature region in order to secure a high vibration-damping ability over a wide range of temperatures.

As to the total thickness of resin layers, namely the thickness of composite film, a good vibration-damping property is obtained when the thickness is 30 $\mu$m or more. On the other hand, in order to secure good workability in bending, deep drawing, etc., it is preferably 100 $\mu$m or less. Most preferably, the thickness is 30 to 70 $\mu$m.

The vibration-damping layer of multilayer structure of this invention is formed as follows. A kind of resin is formed into film by a conventional process such as inflation process, calender process and T-die process. On both sides of this film, there is provided a layer of another resin by one of conventional techniques. These conventional techniques include a process wherein each film layer is firstly formed and then they are converted into a multilayer film by a dry lamination method, a heat lamination method or the like, an extrusion lamination process wherein a resin is extruded onto a film of another resin to form a multilayer film, and a multilayer extrusion process wherein a plurality of resins are simultaneously extruded into respective films and laminated into a multilayer film. The last-mentioned process is particularly preferred from the viewpoint of moldability, interlaminar bonding strength of multilayer film obtained and cost.

Although such a multilayer extrusion is usually limited to the processing of up to three kindthree layer structure products from the viewpoint of cost and ease of forming, it has been revealed that a further improved vibration-damping property can be obtained by placing such processed films of three kindthree layer structure one upon another to form a 5-to 6-layer structure.

In the above process, it is preferable from the viewpoint of cost and easy bonding toward metal plates to use films of two kind-three layer or three kind-three layer structure, prepared by inflation process and passed through pinch rollers, in a lay-flat tube form placed one upon another to form a 5-layers structure.

Examples of metal plates used in this invention are various steel or stainless steel plates and plates formed of single metal or alloys of aluminum, copper, titanium and the like, including surface treated metal plates such as a tinplate sheet and a galvanized steel sheet.

In producing a vibration-damping material according to this method, an ordinary method such as batch or continuous thermal pressing can optionally be used. An example of such methods comprises interposing the above-mentioned resin composition between two metal plates and pressure-bonding them by heating. The bonding is generally conducted at 150° to 260° C.

The vibration-damping material of this invention is particularly useful to be used for preventing noises and vibrations generated from automobiles.

The sources of noises and vibrations in an automobile are their engine parts, an oil pan being the major source among these.

When the material of this invention was used in an oil pan for a diesel engine of a medium sized truck, a noize reduction of 3 dB was otained at a distance of about 1 m from the engine.

It has been revealed also that the effect of preventing noises and vibrations from entering into a car is markedly when the material of this invention is used in the car body materials, particularly in a floor panel.

For preventing noises and vibrations in homes and offices, the vibration-damping material is preferably used in parts of electrical appliances, particularly in a cover material for a motor or a stabilizer. Further, for a similar purpose, the material is favorably used in building materials such as partition materials between rooms, wall materials and floor materials. It has been also revealed that the material is useful for preventing noise pollution when used in sliding doors or aluminum-sashed doors.

A high level of noises is produced by engines or generators for road building or repairing in general. Application to the parts of these machines is another preferable use of the material of this invention.

In preventing noises generated by bicycles and motorcycles used as the means of transportation for the public, good results can be obtained by using the material of this invention as materials for breaking devices or driving chains.

Further, the vibration-damping material of this invention used in floor materials and wall materials of railway cars used as public means of transportation shows a marked effect in preventing noise pollution.

This invention will be specifically explained below with reference to Examples. However, these Examples are merely illustrative and the present invention is in no way restricted by them.

In the Examples, the moduli of elasticity and dissipation factors (tan δ) of the upper and lower layer film and the middle layer film were measured by the use of a Rheovibron (110 Hz) manufactured by Toyo Baldwin Co., Ltd. The percentages of elongation of these films were measured at a stretching velocity of 200 mm/min.

The loss factor ($\eta$) representing the vibration-absorbing ability of a vibration-damping material was measured by applying a forced vibration by a mechanical impedance method (vibration being applied at the center) wherein the frequency was 1,000 Hz and the temperature was 20° to 130° C. Bonding strength toward steel plates was evaluated by interposing the layer of the above-mentioned resin composition of 50 $\mu$m thickness between two same cold-rolled steel plates of 0.8 mm thickness each, pressure-bonding them under conditions of 30 kg/cm$^2$, 190° C. and 5 minutes, and subjecting the resulting laminate to peeling at an angle of 180° and a streching speed of 50 mm/min.

Figure 1A:
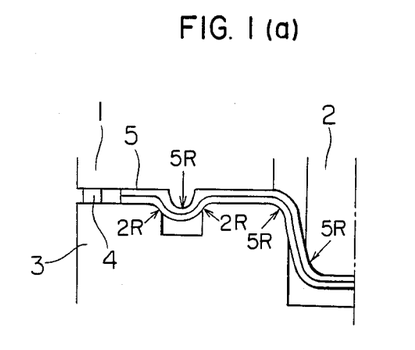
FIG. 1(a) is a sectional view of a die used in bending test.
Figure 1B:
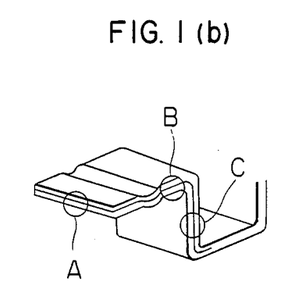
FIG. 1(b) is a perspective view of a shaped article obtained in bending test.
Figure 2A:
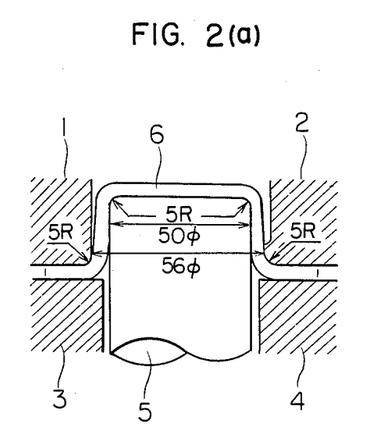
FIG. 2(a) is a sectional view of a die used in deep drawing test.
Figure 2B:
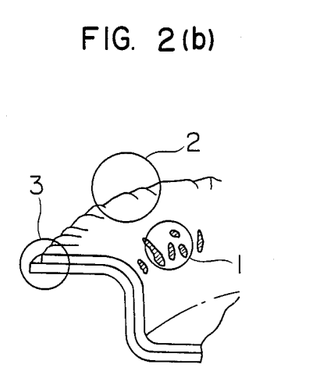
FIG. 2(b) is a perspective view of a shaped article obtained in deep drawing test.

With respect to workability, a bending test and a deep drawing test were carried out by the use of dies shown in FIG. 1 and FIG. 2, respectively, and slippage, peeling, and wrinkle were evaluated.

FIG. 1(a) is a sectional view of the die used in the bending test. In FIG. 1(a), 1, 2 and 3 are die members; 4 is a spacer; 5 is a sample; and 2R and 5R are radius of curvatures. FIG. 1(b) is a perspective view of a shaped article obtained in the bending test. In FIG. 1(b), portions A, B and C are portions for which observation and evaluation are to be made.

FIG. 2(a) is a sectional view of the die used in the deep drawing test. In FIG. 2(a), 1, 2, 3, 4 and 5 are portion members of the die; 6 is a sample; 5R is a radius of curvature; and 50$\phi$ and 56$\phi$ are diameters of die members.

FIG. 2(b) is a perspective view of a shaped article obtained in the deep drawing test. In FIG. 2(b), 1, 2 and 3 are portions for observation and evaluation of wrinkles at portion A, flange wrinkles and plate slippage, respectively.

EXAMPLE 1

An amorphous copolymerized polyethylene terephthalate resin (Kodar ® PETG 6763, mfd. by Eastman Kodak Co.) was supplied to an inflation apparatus equipped with an inflation die of 150 mm bore to obtain a tubular material. The tubular material was taken off under conditions of a take-off speed of 7.0 m/min and a blow-up ratio of 2.0, whereby there was obtained a film having a lay-flat width of 470 mm and a thickness of 50 $\mu$m as shown in Table 1.

The film obtained was interposed between two same cold-rolled steel plates of 0.8 mm thickness, and they were pressure-bonded with heating (30 kg/cm$^2$, 230° C., 5 min). The resulting laminate was measured for bonding property, workability and vibration-damping property.

Figure 3:
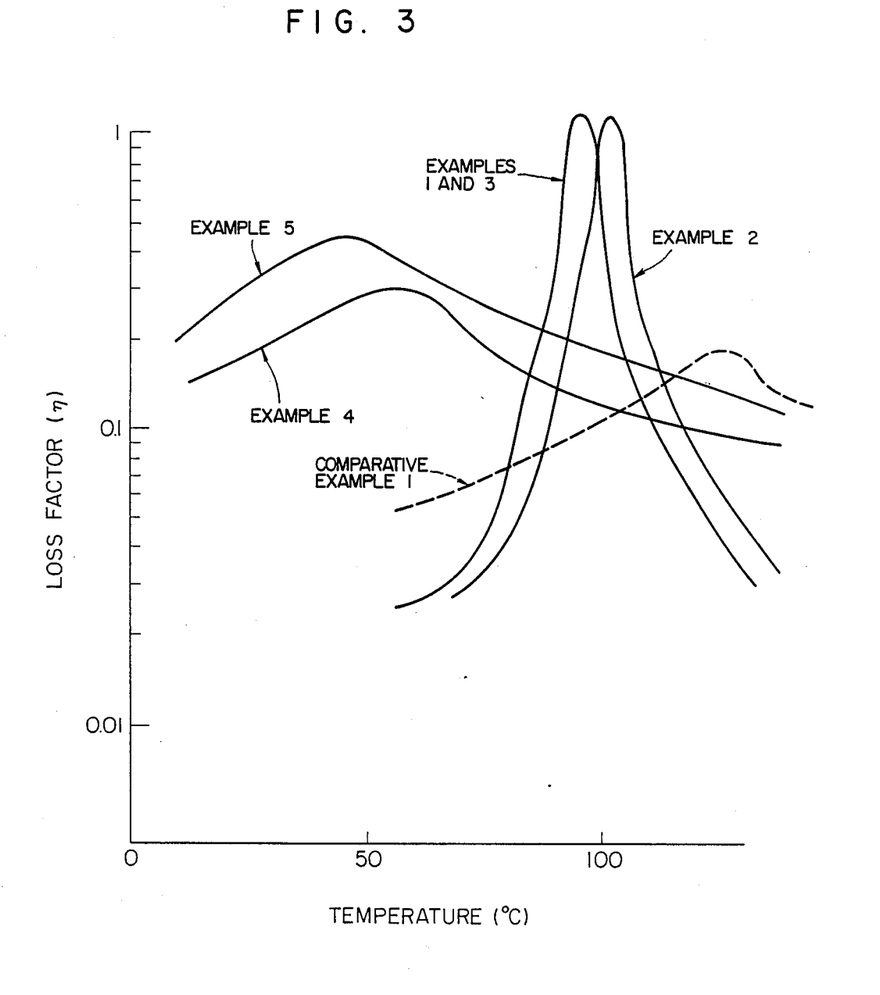
FIGS. 3, 4 and 5 are graphs showing relations between temperature and loss factor ($\eta$), of various vibration-damping materials.

The results are shown in Tables 1 and 2 and FIG. 3. FIG. 3 is a graph showing relations between temperature and loss factor ($\eta$) of vibration-damping materials.

EXAMPLE 2

An amorphous copolymerized polyethylene terephthalate resin (Kodar ® PCTA A-150, mfd. by Eastman Kodak Co.) was supplied to an inflation apparatus equipped with an inflation die of 150 mm bore to obtain a tubular material. The tubular material was taken off under conditions of a take-off speed of 7.0 m/min and a blow-up ratio of 2.0, whereby there was obtained a film having a lay-flat width of 470 mm and a thickness of 50 μm as shown in Table 1.

The film obtained was interposed between two same cold-rolled steel plates of 0.8 mm thickness, and they were pressure-bonded with heating (30 kg/cm², 230° C., 5 min). The resulting laminate was measured for bonding property, workability and vibration-damping property.

The results are shown in Tables 1 and 2 and FIG. 3. FIG. 3 is a graph showing relations between temperature and loss factor ($\eta$) of vibration-damping materials.

EXAMPLE 3

An amorphous copolymerized polyethylene terephthalate resin (Kodar® PETG 6763, mfd. by Eastman Kodak Co.), 70% by weight, and a polyolefin type resin manufactured by Sumitomo Chemical Co., Ltd.) (ethyleneglycidyl methacrylate (10 wt. %)-vinyl acetate (5 wt. %) terpolymer), 30% by weight, were mixed in a Henschell mixer. The mixture was kneaded with an extruder of 30 mmφ maintained at 230° C. and then pelletized.

These pellets were supplied to an inflation apparatus equipped with an inflation die of 150 mm bore to obtain a tubular material. The tubular material was taken off under conditions of a take-off speed of 7.0 m/min and a blow-up ratio of 2.0, whereby there was obtained a film having a lay-flat width of 470 mm and a thickness of 50 μm as shown in Table 1.

The film obtained was interposed between two same cold-rolled steel plates of 0.8 mm thickness, and they were pressure-bonded with heating (30 kg/cm², 230° C., 5 min). The resulting laminate was measured for bonding property, workability and vibration-absorbing property.

The results are shown in Tables 1 and 2 and FIG. 3. FIG. 3 is a graph showing relations between temperature and loss factor ($\eta$) of vibration-damping materials.

EXAMPLE 4

A thermoplastic high molecular weight polyester resin (Vylon® #30P, mfd. by Toyobo Co., Ltd.), 90% by weight, and an epoxy resin (SUMI-®EPOXY ESCN 220-18, mfd. by Sumitomo Chemical Co., Ltd.), 10% by weight, were mixed with a Henschell mixer. The mixture was kneaded with an extruder of 30 mmφ maintained at 170° C. and then pelletized.

These pellets were supplied to an inflation apparatus equipped with an inflation die of 150 mm bore to obtain a tubular material. The tubular material was taken off under conditions of a take-off speed of 7.0 m/min and a blow-up ratio of 2.0, whereby there was obtained a film having a lay-flat width of 470 mm and a thickness of 50 μm as shown in Table 1.

The film obtained was interposed between two same cold-rolled steel plates of 0.8 mm thickness, and they were pressure-bonded with heating (30 kg/cm², 160° C., 5 min). The resulting laminate was measured for bonding property, workability and vibration-absorbing property. The results are shown in Tables 1 and 2 and FIG. 3.

EXAMPLE 5

A thermoplastic high molecular weight polyester resin (crystalline) (Vylon® #30P, mfd. by Toyobo Co., Ltd.), 45% by weight, a thermoplastic high molecular weight polyester resin (amorphous) (Vylon® #500, mfd. by Toyobo Co., Ltd.), 45% by weight, and an epoxy resin (SUMI-®EPOXY ESCN 220-18, mfd. by Sumitomo Chemical Co., Ltd.), 10% by weight, were mixed with a Henschell mixer. The mixture was kneaded with an extruder of 30 mmφ maintained at 170° C. and then pelletized.

These pellets were supplied to an inflation apparatus equipped with an inflation die of 150 mm bore to obtain a tubular material. The tubular material was taken off under conditions of a take-off speed of 7.0 m/min and a blow-up ratio of 2.0, whereby there was obtained a film having a lay-flat width of 470 mm and a thickness of 50 μm as shown in Table 1.

The film obtained was interposed between two same cold-rolled steel plates of 0.8 mm thickness, and they were pressure-bonded with heating (30 kg/cm², 160° C., 5 min). The resulting laminate was measured for bonding property, workability and vibration-absorbing property. The results are shown in Tables 1 and 2 and FIG. 3.

EXAMPLE 6

A tubular material was obtained by using an inflation apparatus having an inflation die of 150 mm bore equipped with an extruder fed with an amorphous copolymerized polyethylene terephthalate resin (Kodar® PETG 6763, mfd. by Eastman Kodak Co.), an extruder fed with an amorphous copolymerized polyethylene terephthalate resin (Kodar® PCTA A-150, mfg. by Eastman Kodak Co.), and an extruder fed with a high molecular weight polyester resin (Vylon® #200, mfd. by Toyobo Co., Ltd.). The tubular material was taken off under conditions of a take-off speed of 7.0 m/min and a blow-up ratio of 2.0, whereby there was obtained a film having a lay-flat width of 470 mm and a thickness of 50 μm as shown in Table 3.

The film obtained was interposed between two same cold-rolled steel plates of 0.8 mm thickness and they were pressure-bonded with heating (30 kg/cm², 230° C., 5 min.). The resulting laminate was measured for bonding property, workability and vibration-absorbing property.

Figure 4:
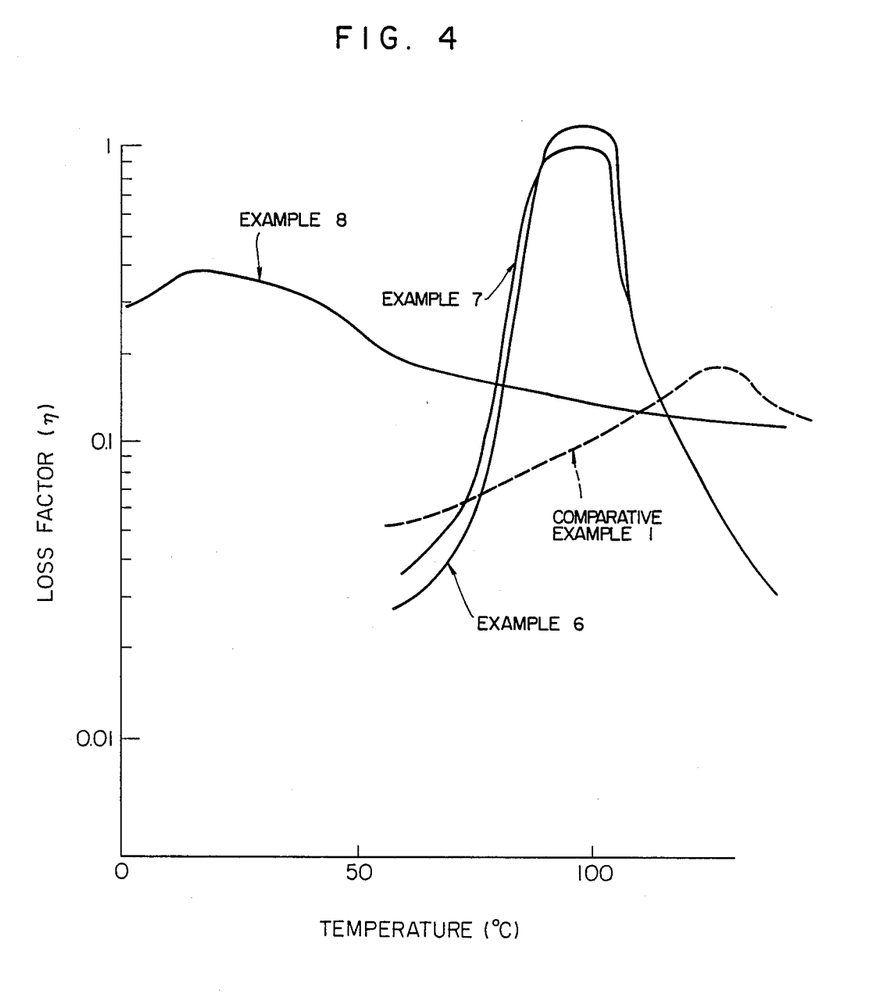

The results are shown in Tables 3 and 4 and FIG. 4. FIG. 4 is a graph showing relations between temperature and loss factor ($\eta$) of vibration-damping materials.

EXAMPLE 7

A tubular material was obtained by using an inflation apparatus having an inflation die of 150 mm bore equipped with an extruder fed with pellets of a mixture of 70% by weight of an amorphous copolymerized polyethylene terephthalate resin (Kodar® PETG 6763, mfd. by Eastman Kodak Co.) and 30% by weight of an ethylene-glycidyl methacrylate (10 wt. %)-vinyl acetate (5 wt. %) terpolymer (MI: 7, mfd. by Sumitomo Chemical Co., Ltd.) (said pellets being prepared by mixing the resins in a Henschell mixer, kneading the mixture with an extruder of 30 mmφ maintained at 230° C. and then pelletizing he kneaded mixture), an extruder fed with pellets of a mixture of 80% by weight of an amorphous copolymerized polyethylene terephthalate resin (Kodar® PCTA A-150, mfd. by Eastman Kodak Co.) and 20% by weight of an ethylene-glycidyl methacrylate (10 wt. %) copolymer resin (MI:3, experimentally prepared by Sumitomo Chemical Co., Ltd.) (the pellets being prepared in the same manner as mentioned above), and an extruder fed with pellets of a mixture of 90% by weight of a high molecular weight polyester resin (Vylon® #200, mfd. by Toyobo Co., Ltd.) and 10% by weight of an ethylene-glycidyl methacrylate (10 wt. %)-vinyl acetate (5 wt. %) terpolymer resin (MI:7, experimentally prepared by Sumitomo Chemical Co., Ltd.) (the pellets being prepared in the same manner as mentioned above). The tubular material was taken off under conditions of a take-off speed of 7.0 m/min and a blow-up ratio of 2.0, whereby there was obtained a film having a lay-flat width of 470 mm and a thickness of 50 μm as shown in Table 3.

The film obtained was interposed between two same cold-rolled steel plates of 0.8 mm thickness, and they were pressure-bonded with heating (30 kg/cm², 230° C., 5 min). The resulting laminate was measured for bonding property, workability, and vibration-absorbing property.

The results are shown in Tables 3 and 4 and FIG. 4. FIG. 4 is a graph showing relations between temperature and loss factor (η) of vibration-damping materials.

EXAMPLE 8

A thermoplastic high molecular weight polyester resin (crystalline) (Vylon® #30P, mfd. by Toyobo Co., Ltd.), 90% by weight, and an epoxy resin (SUMI-®EPOXY ESCN 220-18, mfd. by Sumitomo Chemical Co., Ltd.), 10% by weight, were mixed with a Henschell mixer, and the mixture was kneaded with an extruder of 30 mmφ maintained at 170° C. and then pelletized. The pelletized material is referred to as the raw material (A).

Then, a thermoplastic high molecular weight polyester resin (crystalline) (Vylon® #30P, mfd. by Toyobo Co., Ltd.), 45% by weight, a thermoplastic high molecular weight polyester resin (Vylon® #500, mfd. by Toyobo Co., Ltd.), 45% by weight, and an epoxy resin (SUMI®-EPOXY ESCN 220-18, mfd. by Sumitomo Chemical Co., Ltd.), 10% by weight, were mixed with a Henschell mixer. The mixture was kneaded with an extruder of 30 mmφ maintained at 170° C. and then pelletized. The pelletized material is referred to as the raw material (B).

A tubular material was obtained by using an inflation apparatus having a multilayer inflation die of 150 mm bore equipped with an extruder to which the raw material (A) was fed to form an upper and a lower layer and an extruder to which the raw material (B) was fed to form a middle layer. The tubular material was taken off under conditions of a take-off speed of 7.0 m/min and a blow-up ratio of 2.0, whereby there was obtained a film having a lay-flat width of 470 mm and a thickness of 100 μm.

The physical properties of resins forming the upper and lower layers and the middle layer are shown in Table 3.

The film obtained above was interposed between two same cold-rolled steel plates of 0.8 mm thickness, and they were pressure-bonded with heating (30 kg/cm², 170° C., 5 min). The resulting laminate was measured for bonding property, workability and vibration-absorbing property. The results are shown in Tables 3 and 4 and FIG. 4. FIG. 4 is a graph showing relations between temperature and loss factor (η) of vibration materials.

EXAMPLE 9

A copolymerized polyethylene terephthalate resin (Kodar® PETG 6763, mfd. by Eastman Kodak Co.) was supplied as a resin for the upper and lower layers to a multilayer inflation apparatus provided with a two kind-three layer die of 150 mm bore. An ethylene-vinyl acetate (25 wt. %) copolymer (Evatate®, mfd. by Sumitomo Chemical Co., Ltd.) having a melt index of 3 g/10 min was simultaneously supplied as a resin for the middle layer to the same inflation apparatus. The resins supplied to form each layer was sticked together inside the die to obtain a tubular material having a three layer sandwich structure. The tubular material was taken off under conditions of a take-off speed of 7.0 m/min and a blow-up ratio of 2.0, whereby there was obtained a film of three layer sandwich structure having a lay-flat width of 470 mm and an each layer thickness as shown in Table 5.

The film obtained was interposed between two same cold-rolled steel plates of 0.8 mm thickness, and they were pressure-bonded with heating (30 kg/cm², 230° C., 5 min). The resulting laminate was measured for bonding property, workability, and vibration-absorbing property.

Figure 5:
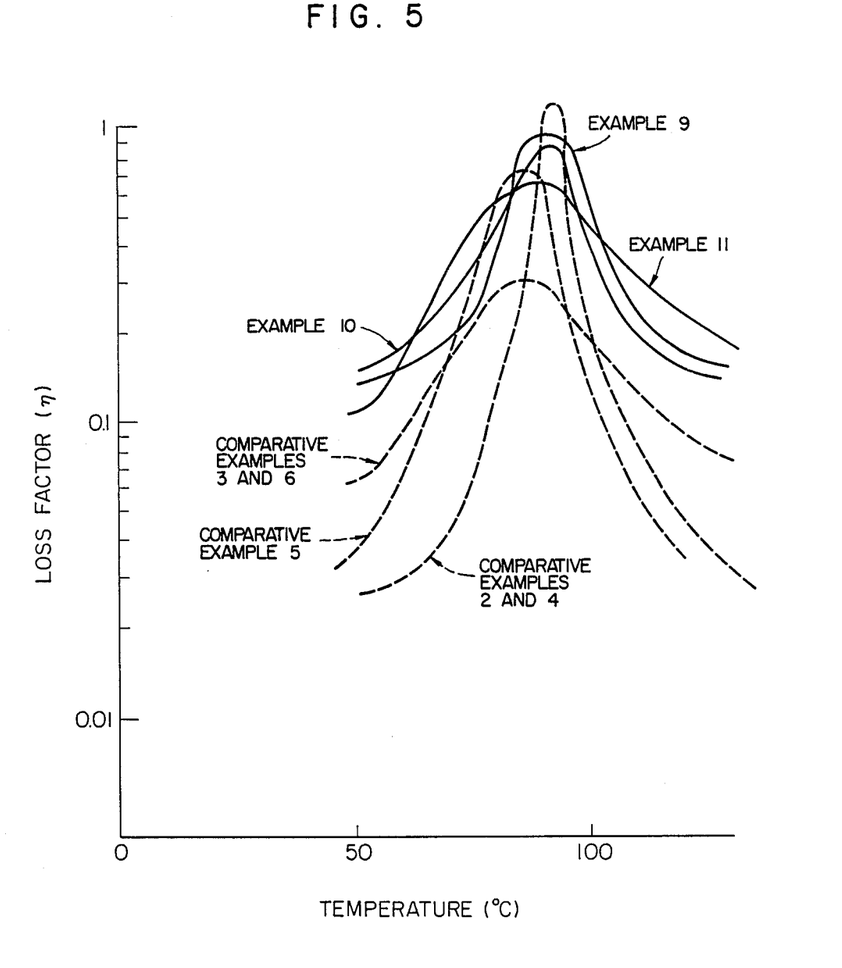

The results are shown in Tables 5, 7 and 8 and FIG. 5. FIG. 5 is a graph showing relations between temperature and loss factor (η) of vibration-damping materials.

EXAMPLE 10

A copolymerized polyethylene terephthalate resin (Kodar® PETG 6763, mfd. by Eastman Kodak Co.), 70% by weight, and a polyolefin type resin manufactured by Sumitomo Chemical Co., Ltd. (an ethylene-glycidyl methacrylate (10 wt. %)-vinyl acetate (5 wt. %) terpolymer), 30% by weight, were mixed with a Henschell mixer, and the mixture was kneaded with an extruder of 30 mmφ maintained at 230° C., and then pelletized.

The pellets were supplied as a resin for the upper and lower layers to a multilayer inflation apparatus equipped with a two kind—three layer inflation die of 150 mm bore. An ethylene-vinyl acetate (25 wt. %) copolymer (Evatate®, mfd. by Sumitomo Chemical Co., Ltd.) having a melt index of 3 g/10 min was simultaneously supplied as a resin for the middle layer to the same apparatus. The resins supplied to form each layer were sticked together inside the die to obtain a film having a three layer sandwich structure with the same dimensions as those in Example 9.

The film obtained above was interposed between two same cold-rolled steel plates of 0.8 mm thickness, and they are pressure-bonded with heating (30 kg/cm², 230° C., 5 min). The resulting laminate was measured for bonding property, workability and vibration-absorbing property.

The results are shown in Tables 5, 7 and 8 and FIG. 5. FIG. 5 is a graph showing relations between temperature and loss factor (η) of vibration-damping materials.

EXAMPLE 11

A thermoplastic polyester resin (Vylon® #200, mfd. by Toyobo Co., Ltd.), 80% by weight, and a polyolefin type resin manufactured by Sumitomo Chemical Co., Ltd. (an ethylene-glycidyl methacrylate (10 wt. %)vinyl acetate (5 wt. %) terpolymer), 20% by weight, were mixed with a Henschell mixer, and the mixture was kneaded with an extruder of 30 mmφ maintained at 190° C., and then pelletized.

The pellets obtained above were supplied as a resin for the upper and lower layers to a multilayer inflation apparatus equipped with a two kind—three layer inflation die of 150 mm bore. Simultaneously, an ethylene-acrylic acid (8 wt.%) copolymer having a melt index of 2 g/10 min (mfd. by Dow Chemical Co.) was supplied as a resin for the middle layer to the same inflation apparatus. The resins supplied to form each layer were sticked together inside the die to obtain a film having a three layer sandwich structure with the same dimensions as those in Example 9.

The film thus obtained was interposed between two same cold-rolled steel plates of 0.8 mm thickness, and they were pressure-bonded with heating (30 kg/cm², 230° C., 5 min). The resulting laminate was measured for bonding property, workability and vibration-absorbing property.

The results are shown in Tables 5, 7 and 8 and FIG. 5. FIG. 5 is a graph showing relations between temperature and loss factor ($\eta$) of vibration-damping materials.

COMPARATIVE EXAMPLE 1

A resin composition comprising mainly a polyolefin type resin modified with a carboxylic acid as disclosed in Japanese patent application Kokai (laid-open) No. 80454/1984 was prepared in the following manner according to the method described in Example 4 of the above patent application.

To a linear low density polyethylene of a melt index of 4 g/10 min (mfd. by CdF Chimie), were added 0.7% by weight (based on the polyethylene) of maleic anhydride and 0.1% by weight (based on the polyethylene) of t-butyl peroxylaurate. They were mixed for 2 minutes with a Henschell mixer. The resulting mixture was kneaded with an extruder of 30 mm$\phi$ maintained at 190° C. and then pelletized.

100 Parts by weight of the modified polyethylene obtained above, 125 parts by weight of a linear low density polyethylene of a melt index of 4 g/10 min (mfd. by CdF Chimie), and 25 parts by weight of a methyl methacrylate polymer were mixed. The resulting mixture was kneaded with an extruder of 30 mm$\phi$ maintained at 190° C., and then pelletized.

The pelletized material was formed into a film in the same manner as in Examples 1 to 5. The film obtained was interposed between two same cold-rolled steel plates of 0.8 mm thickness, and they were pressure-bonded with heating (30 kg/cm², 170° C., 5 min). The resulting laminate was measured for bonding property, workability and vibration-absorbing property.

The results are shown in Tables 1, 2 and 4 and FIGS. 3 and 4. FIGS. 3 and 4 are graphs showing relations between temperature and loss factor ($\eta$) of vibration-damping materials.

COMPARATIVE EXAMPLES 2 to 6

The resins for the upper and lower layers and those for the middle layer used in Examples 9 to 11 were each supplied singly to an inflation apparatus using an extruder of 30 mm$\phi$ equipped with an inflation die of 100 mm bore to obtain a tubular material. The tubular material was taken off under conditions of a take-off speed of 7.0 m/min and a blow-up ratio of 2.0, whereby there was obtained a film having a lay-flat width of 300 mm and a thickness shown in Table 6.

The film thus obtained was interposed between two same cold-rolled steel plates of 0.8 mm thickness, and they were pressure-bonded with heating (30 kg/cm², 230° C., 5 min). The resulting laminate was measured for bonding property, workability and vibration-absorbing property.

The results are shown in Tables 6 to 8 and FIG. 5.

TABLE 1

| | | Core resin | | | Adhesive properties |
|---|---|---|---|---|---|
| | | | Physical properties of resin | | 180°-peeling strength (kg/cm) |
| | Film thickness ($\mu$m) | Resin | Elongation (%) | tan δ peak temperature (°C.) | |
| Example 1 | 50 | Kodar ® PETG 6763 | 60 | 98 | 3.5 |
| Example 2 | 50 | Kodar ® PCTA A-150 | 40 | 108 | 3.1 |
| Example 3 | 50 | Kodar ® PETG 6763/ polyolefin resin | 180 | 98 | 7.3 |
| Example 4 | 50 | Vylon ® #30P/ SUMI- ® EPOXY ESCN 220-18 | 350 | 5 | 5.2 |
| Example 5 | 50 | Vylon ® #30P/#50P/ SUMI- ® EPOXY ESCN 220-18 | 700 | 10 | 5.4 |
| Comparative Example 1 | 50 | Modified polyethylene | 400 | −10 | 11.3 |

TABLE 2

| | Bending | | | | Deep Drawing | | |
|---|---|---|---|---|---|---|---|
| | Portion A slippage | Portion A peeling | Portion B peeling | Portion C peeling | Plate slippage 2 Ton* | Portion A wrinkle 2 Ton* | Flange wrinkle 2 Ton* |
| Example 1 | | | | | | | |
| Example 2 | | | | | | | |
| Example 3 | | | | | | | |
| Example 4 | | | | | | | |
| Example 5 | | | | | | | |
| Comparative | | | | | | | |

TABLE 2-continued

| | Bending | | | | Deep Drawing | | |
| --- | --- | --- | --- | --- | --- | --- | --- |
| | Portion A slippage | Portion A peeling | Portion B peeling | Portion C peeling | Plate slippage 2 Ton* | Portion A wrinkle 2 Ton* | Flange wrinkle 2 Ton* |
| Example 1 | | | | | | | |

Evaluation
Slippage : No
Peeling : No
Wrinkle : No
*: Blank holder pressure

TABLE 3

| | Core resin | | | | | Adhesive properties 180°-peeling strength (kg/cm) |
| --- | --- | --- | --- | --- | --- | --- |
| | Film thickness (μm) | Resin | Physical properties of resin | | | |
| | | | Elongation (%) | Glass transition temperature (°C.) | tan δ peak temperature (°C.) | |
| Example 6 | 50 | Kodar ® PETG 6763 | 60 | 81 | 98 | 3.1 |
| | | Kodar ® PCTA A-150 | 40 | 87 | 110 | |
| | | Vylon ® #200 | 30 | 67 | 83 | |
| Example 7 | 50 | Kodar ® PETG 6763/ modified olefin resin | 150 | 81 | 98 | 7.3 |
| | | Kodar ® PCTA A-150/ modified olefin resin | 130 | 86 | 108 | |
| | | Vylon ® #200/ modified olefin resin | 70 | 67 | 83 | |
| Example 8 | 100 | Vylon ® #30P/ SUMI- ® EPOXY ESCN 220-18 | 350 | −15 | 5 | 8.7 |
| | | Vylon ® #30P/#500/ SUMI- ® EPOXY ESCN 220-18 | 700 | −1 | 10 | |

TABLE 4

| | Bending | | | | Deep drawing | | |
| --- | --- | --- | --- | --- | --- | --- | --- |
| | Portion A slippage | Portion A peeling | Portion B peeling | Portion C peeling | Plate slippage 2 Ton* | Portion A wrinkle 2 Ton* | Flange wrinkle 2 Ton* |
| Example 6 | | | | | | | |
| Example 7 | | | | | | | |
| Example 8 | | | | | | | |
| Comparative Example 1 | | | | | | | |

Evaluation
Slippage : No
Peeling : No
Wrinkle : No
*: Blank holder pressure

TABLE 5

| | Core resin | | | | | | Lower and upper layers resin | | |
| --- | --- | --- | --- | --- | --- | --- | --- | --- | --- |
| | Film thickness | | | Middle layer resin | | | | | |
| | Lower layer (μm) | Middle layer (μm) | Upper layer (μm) | Resin | Elongation (%) | tan δ peak temperature (°C.) | Resin | Elongation (%) | tan δ peak temperature (°C.) |
| Example 9 | 10 | 30 | 10 | Evatate ® | 400 | −11 | Kodar ® PETG 6763 | 60 | 98 |
| Example 10 | 10 | 30 | 10 | Evatate ® | 400 | −11 | Kodar ® PETG 6763 70%/polyolefin resin 30% | 180 | 98 |
| Example 11 | 5 | 40 | 5 | Ethylene-acrylic acid copolymer | 350 | −19 | Vylon ® #200 80%/polyolefin resin 20% | 40 | 85 |

TABLE 6

| | Core resin | | | |
| --- | --- | --- | --- | --- |
| | | | Physical properties of resin | |
| | Film thickness (μm) | Resin | Elongation (%) | tan δ peak temperature (°C.) |
| Comparative Example 2 | 50 | Kodar ® PETG 6763 | 60 | 98 |
| Comparative Example 3 | 50 | Evatate ® | 400 | −11 |
| Comparative Example 4 | 50 | Kodar ® PETG 6763 70%/polyolefin resin 30% | 180 | 98 |
| Comparative Example 5 | 50 | Vylon ® #200 80%/polyolefin resin 20% | 40 | 85 |
| Comparative Example 6 | 50 | Ethylene-acrylic acid copolymer | 350 | −19 |

TABLE 7

| | Steel plate/ polymer/steel plate peeling strength (kg/cm) | Loss factor (η) | | | |
| --- | --- | --- | --- | --- | --- |
| | | 50° C. | 80° C. | 90° C. | 110° C. |
| Example 9 | 3.5 | 0.14 | 0.35 | 0.85 | 0.20 |
| Example 10 | 7.0 | 0.16 | 0.42 | 0.81 | 0.18 |
| Example 11 | 7.3 | 0.10 | 0.52 | 0.61 | 0.26 |
| Comparative Example 2 | 3.6 | 0.02 | 0.14 | 1.10 | 0.07 |
| Comparative Example 3 | 0.2 | 0.06 | 0.26 | 0.26 | 0.10 |
| Comparative Example 4 | 8.0 | 0.02 | 0.14 | 1.10 | 0.07 |
| Comparative Example 5 | 7.8 | 0.03 | 0.46 | 0.42 | 0.05 |
| Comparative Example 6 | 1.8 | 0.06 | 0.26 | 0.26 | 0.10 |

TABLE 8

| | Bending | | | | Deep drawing | | |
| --- | --- | --- | --- | --- | --- | --- | --- |
| | Portion A slippage | Portion A peeling | Portion B peeling | Portion C peeling | Plate slippage 2 Ton* | Portion A wrinkle 2 Ton* | Flange wrinkle 2 Ton* |
| Example 9 | | | | | | | |
| Example 10 | | | | | | | |
| Example 11 | | | | | | | |
| Comparative Example 2 | | | X | X | | | X |
| Comparative Example 3 | X | X | X | X | X | X | X |
| Comparative Example 4 | | | | X | | | X |
| Comparative Example 5 | | | X | X | | | X |
| Comparative Example 6 | X | X | X | X | X | X | X |

Evaluation
Slippage : No, X: Yes
Peeling : No, X: Yes
Wrinkle : No, X: Yes
*: Blank holder pressure

What is claimed is:

1. A vibration-damping material consisting of two metal plates and a vibration-damping layer formed of thermoplastic resin interposed between the two metal plates, in which said thermoplastic resin has a percentage of elongation at 20° C. of 30% or more, a peak temperature of dissipation factor (tan δ) in the range of −50° C. to 130° C., and a bonding strength toward metal plates of 3 kg/cm or more as determined by 180°-peeling test at 20° C., wherein the thermoplastic resin is formed of a resin composition comprising 100 parts by weight of a resin component (A) comprising at least one member selected from the group consisting of a mixture of crystalline polyester-type resin and an amorphous polyester-type resin, polyolefin-type resin and 1 to 100 parts by weight of a copolymer component (B) comprising 70 to 99.5% by weight of ethylene, 0.5 to 20% by weight of flycidyl methacrylate and 0 to 20% by weight of vinyl acetate.

2. A vibration-damping material according to claim 1, wherein said vibration-damping layer has a multilayer structure consisting of a combination of at least two layers.

3. A vibration-damping material according to claim 2, wherein said vibration-damping layer consists of a combination of layers each formed of resin having a peak value of dissipation factor (tan δ) of 0.5 or more and a peak temperature of dissipation factor differing by 5 to 20° C. from each other.

4. A vibration-damping material according to claim 2, wherein the resin constituting said vibration-damping layer contains a copolymer comprising 70 to 99.5% by weight of ethylene, 0.5 to 20% by weight of glycidyl methacrylate, and 0 to 20% by weight of vinyl acetate.

5. A vibration-damping material according to claim 2, wherein said vibration-damping layer has a multilayer structure consisting of at least two layers each formed of a mixture of crystalline polyester-type resin and amorphous polyester-type resin having a glass transition temperature (Tg) differing by 5 to 15° C. from each other.

6. A vibration-damping material according to claim 5, wherein said vibration-damping layer has a three-layer structure consisting of a resin layer having a glass transition temperature of 45° C. to 60° C., a resin layer having that of 60° C. to 75° C. and a resin layer having that of 75° C. to 90° C.

7. A vibration-damping material according to claim 5, wherein the polyester type resin constituting said at least two layers of the vibration-damping layer is amorphous polyester copolymer resin.

8. A vibration-damping material according to claim 5, wherein the resin constituting said vibration-damping layer adjoining the metal plates contains a copolymer comprising 70 to 99.5% by weight of ethylene, 0.5 to 20% by weight of glycidyl methacrylate, and 0 to 20% by weight of vinyl acetate.

9. A vibration-damping material according to claim 2, wherein said vibration-damping material consists of film or sheet formed of a resin composition (D) as a middle layer and resin layers formed of a resin composition (C) provided on both sides of said film or sheet as an upper and a lower layer, said resin composition (D) being composed of (1) at least one resin selected from the group consisting of polyolefin type resins and ionomer resins each having a percentage of elongation at 20° C. of 50% or more and a peak temperature of dissipation factor (tan δ) in the range of −50° C. to 130° C. and (2) a resin mixture of said at least one resin with a synthetic rubber having a percentage of elongation at 20° C. of 100% or more and a peak temperature of dissipation factor in the range of −10° C. to 130° C..; and said resin composition (C) comprising 100 parts by weight of a resin component (A) comprising at least one member selected from the group consisting of a mixture of crystalline polyester-type resin and an amorphous polyester-type resin, and 1 to 100 parts by weight of a copolymer component (B) comprising 70 to 99.5% by weight of ethylene, 0.5 to 20% by weight of glycidyl methacrylate and 0 to 20% by weight of vinyl acetate, and having a modulus of elasticity in shear at 20 C. higher than that of the resin composition (D), a percentage of elongation at 20° C. or 30% or more, peak temperature of dissipation factor (tan δ) in the range of −40° C. to 180° C., and a bonding strength toward metal plates of 3 kg/cm or more as determined by 180°-peeling test at 20° C.

10. A vibration damping material according to claim 9, wherein said resin composition (D) has a peak temperature of dissipation factor (tan δ), attributable to melting, in the application temperature region and said resin composition (C) has a peak temperature of dissipation factor (tan δ), attributable to glass transition temperature (Tg), in the application temperature region.

11. A vibration-damping material according to claim 10, wherein the application temperature region is 60° C. to 180° C.

12. A vibration-damping material according to claim 9, wherein said resin composition (D) is at least one resin selected from the group consisting of ethylene-vinyl acetate copolymer and ethylene-acrylic acid copolymer.

13. A vibration-damping material according to claim 9, wherein said resin composition (D) comprises ethylene-vinyl acetate copolymer and isobutylene-isoprene copolymer rubber compounded together.

14. A vibration-damping material according to claim 2, wherein said vibration-damping layer is a film of five-layer structure prepared by forming a film of the thermoplastic resin having a two kind-three layer or three kind-layer structure by inflation, passing the tubular film material obtained through a pinch roller, and supplying the resulting two flat tubular film materials placed on upon another.

15. A vibration-damping material according to claim 1, wherein said polyester-type resin is formed of a resin composition comprising a mixture of polyester resin and epoxy resin.

16. A vibration-damping material according to claim 1, wherein the resin constituting said vibration-damping layer has a peak temperature of dissipation factor (tan δ) in the range of 25° C. to 155° C. and a peak value thereof of 0.8 or more.

17. A vibration-damping material according to claim 1, wherein the polyester type resin contains a polyester type copolymer comprising terephthalic acid residues, ethylene glycol residues and 1,4-cyclohexanediol residues.

18. A vibration-damping material according to claim 1, wherein the polyester type resin is amorphous polyester copolymer containing a larger proportion of 1,4-cyclohexanedimethanol residues than that of ethylene glycol residues.

19. A vibration-damping material according to claim 1, wherein the polyester type resin contains polyester type copolymer synthesized from terephthalic acid, isophthalic acid, and 1,4-cyclohexanedimethanol.

20. A vibration-damping material according to claim 1, wherein the amorphous polyester type resin is an amorphous high molecular weight polyester type copolymer resin thereof.

21. A vibration-damping material according to claim 1, wherein a mixture of crystalline high molecular weight polyester resin and epoxy resin or a mixture of crystalline high molecular weight polyester resin, amorphous high molecular weight polyester resin and epoxy resin is used in place of the polyester type resin.

22. A vibration-damping material according to claim 1, wherein said resin composition (A) is a resin composition comprising a mixture of 100 parts by weight of polyester type and 1 to 900 parts by weight of a copolymer comprising 70 to 99.5% by weight of ethylene, 0.5 to 20% by weight of glycidyl methacrylate and 0 to 20% by weight of vinyl acetate.

23. A vibration damping material according to claim 1, wherein said vibration-damping layer formed of thermoplastic resin has a thickness of 30 μm to 100 μm.

24. A vibration-damping material according to claim 1, wherein said vibration-damping layer formed of thermoplastic resin has a thickness of 0.3 mm to 5 mm.

25. An engine component comprising a combination of a vibration-damping material according to claim 1 and an engine part means.

26. An improved oil pan comprising in combination a vibration-damping material according to claim 1 and an oil pan means.

27. A component of automobile car bodies comprising in combination the vibration-damping material according to claim 1 and an automobile car body component means.

28. The component according to claim 27, wherein the car body component means is a floor or dashboard panel.

29. A component for an electrical appliance comprising the vibration-damping material according to claim 1 in combination with an electrical appliance component means.

30. The component according to claim 29, wherein the electrical appliance component means is a stabilizer or a cover for a motor.

31. A building material component comprising in combination the vibration-damping material according to claim 1 and a building material means.

32. The building material component according to claim 31, wherein the building material means is a partition between rooms, a wall material, a floor material, or an aluminum-sashed door.

33. An improved component for bicycles and motorcycles comprising in cmobination the vibration-damping material according to claim 1 and a component means for bicycles and motorcycles.

34. The component according to claim 33, wherein the means are a braking device or driving chain.

35. A component of railway cars comprising in combination the vibration-damping material according to claim 1 and a floor or wall component.

36. An improved component for road building or repairing comprising in combination with vibration-damping material according to claim 1 and a road building or repairing component.

* * * * *